United States Patent [19]
Earnest

[11] Patent Number: 5,138,779
[45] Date of Patent: Aug. 18, 1992

[54] ANIMATED BUTTON UTILIZING SHAPE MEMORY WIRE

[76] Inventor: Michael L. Earnest, 310-13th St., Huntington Beach, Calif. 92648

[21] Appl. No.: 726,836

[22] Filed: Jul. 8, 1991

[51] Int. Cl.[5] .......................... A44C 3/00; G09F 19/08
[52] U.S. Cl. ......................................... 40/1.6; 40/421; 40/464; 446/14
[58] Field of Search .................. 40/411, 416–421, 40/427, 463, 464, 485, 508, 509, 1.6; 446/14

[56] References Cited

U.S. PATENT DOCUMENTS

| | | |
|---|---|---|
| 725,585 | 4/1903 | Pollock . |
| 889,714 | 6/1908 | McDonald . |
| 1,082,679 | 12/1913 | Connor . |
| 1,357,706 | 11/1920 | Halpern et al. ............... 40/418 X |
| 1,726,294 | 8/1929 | Greene ........................... 40/418 X |
| 2,050,568 | 8/1936 | Groth ............................... 40/463 |
| 2,091,670 | 8/1937 | Budd .............................. 40/421 X |
| 2,521,198 | 9/1950 | Adler . |
| 2,675,543 | 4/1954 | Marchment .................... 40/421 |
| 3,377,818 | 4/1968 | Marek . |
| 3,377,819 | 4/1968 | Joy . |
| 3,839,821 | 10/1974 | Forsman . |
| 4,244,140 | 1/1981 | Kim .................................. 446/14 |
| 4,531,310 | 7/1985 | Acson et al. ................... 40/455 X |
| 4,683,669 | 8/1987 | Greer, Jr. ........................ 40/463 X |
| 4,698,927 | 10/1987 | Yoshiro ............................. 40/1.6 |
| 5,010,665 | 4/1991 | Clinkscales . |
| 5,013,276 | 5/1991 | Garfinkel ......................... 446/14 |

FOREIGN PATENT DOCUMENTS 1389801  4/1988  U.S.S.R. ........................ 446/14

Primary Examiner—Kenneth J. Dorner
Assistant Examiner—James M. Gardner
Attorney, Agent, or Firm—Poms, Smith, Lande & Rose

[57] ABSTRACT

A battery operated animated button is disclosed which is worn by a user and includes a display portion which moves and may selectively display a hidden message or the like. The button includes a circuit board activated by batteries, with a wire of a titanium-alloy material activated by the circuit board to contract to move the display portion.

11 Claims, 2 Drawing Sheets

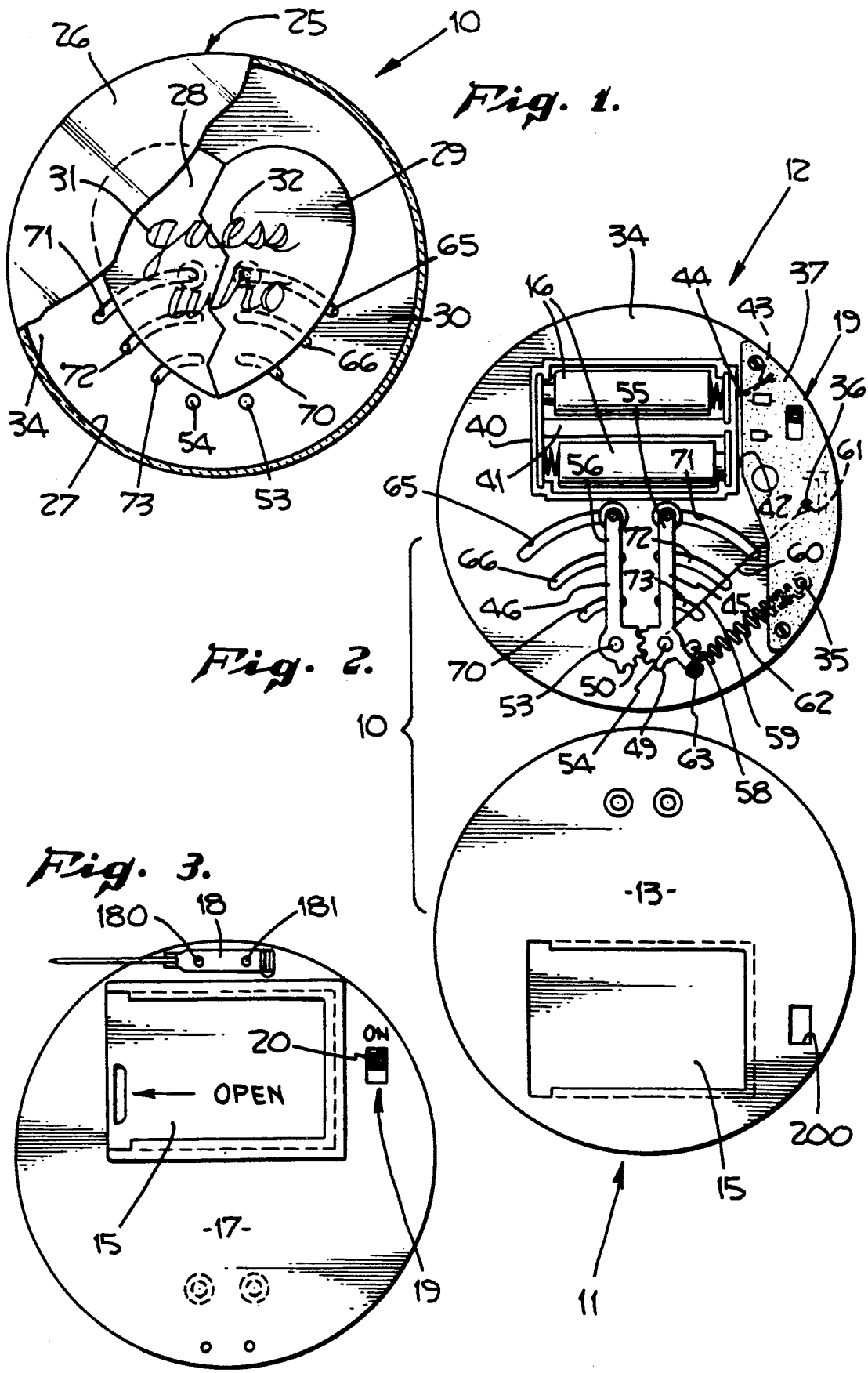

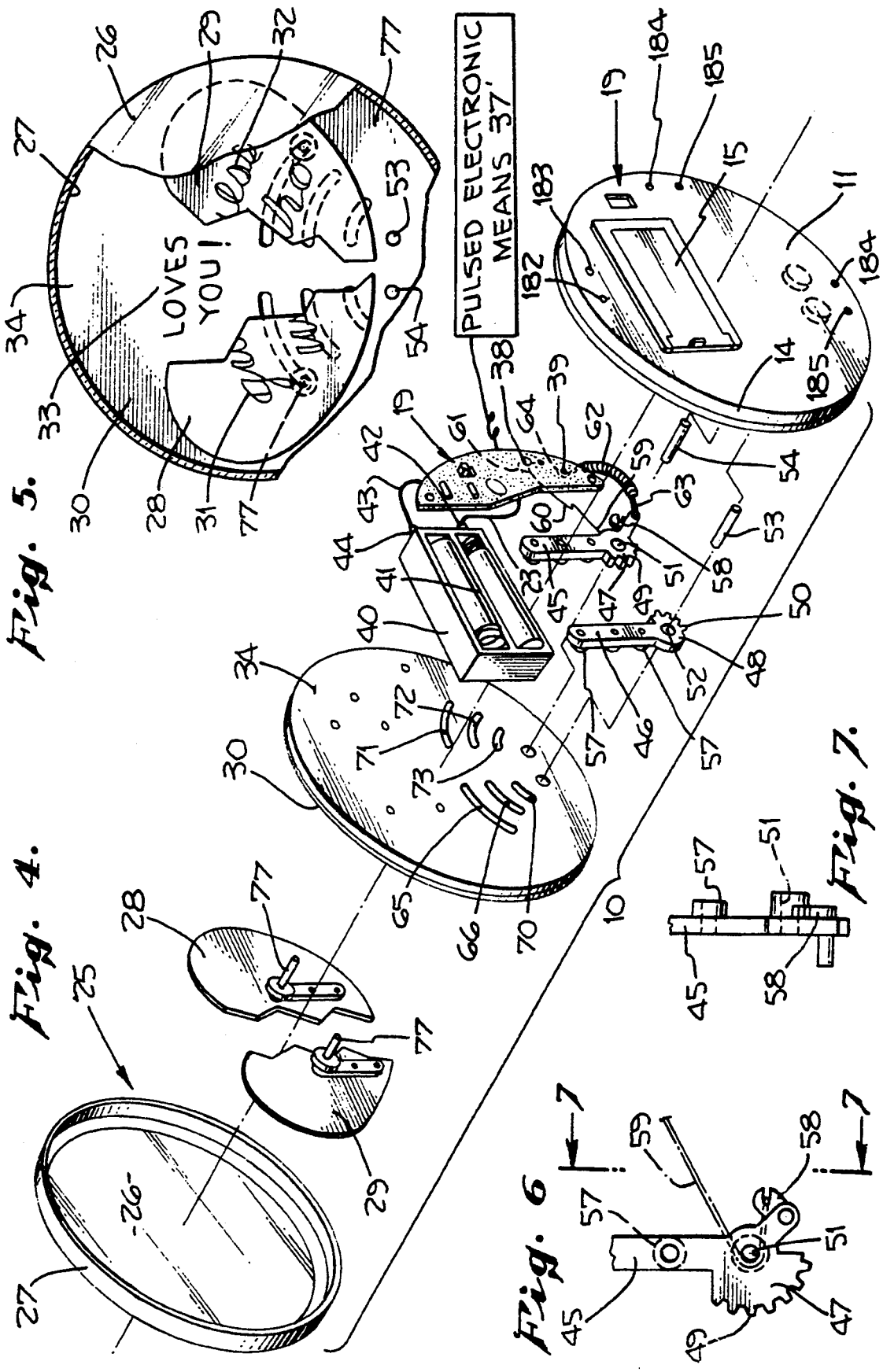

ns when sections 11, 12 are assembled together. As seen in FIG. 3, the outer surface 17 of section 11 may have a conventional pin clip 18 that may be selectively opened and closed to pin button 10 to the lapel of a jacket, a dress, or a sweater or shirt or the like. Pin 18 may snap fit via pins 180, 181 into spaced holes, such as holes 182, 183 through section 11. Like spaced holes 184, 185 are provided elsewhere through section 11. Thus, pin 18 can be snap fit into a plurality of places depending on the orientation of the design of the button 10 desired. An on-off switch 19 may be provided in section 12 having a selectively movable pushbutton 20 extending through opening 200 in section 11, when section 11 is assembled to section 12, thus being accessible from the exterior of button 10.

ANIMATED BUTTON UTILIZING SHAPE MEMORY WIRE

BACKGROUND OF THE INVENTION

1. FIELD OF THE INVENTION

The invention relates to display buttons; and, more particularly, to a powered animated display button.

2. DESCRIPTION OF THE PRIOR ART

Novelty devices in the form of buttons or the like are quite popular. Such buttons can be used to display one's politics, or honor a particular holiday, or otherwise identify one's special interests. Battery operated or otherwise powered animated displays are known but quickly lose their novelty or require miniaturized components to fit into a very small space, such as a button worn by a user. This space must also accommodate the source of power for the button and the components should be able to operate under relatively rough conditions and for an appreciable length of time.

There thus exists a need for an animated button that can be used to entertain and works efficiently under all conditions.

SUMMARY OF THE INVENTION

It is an object of this invention to provide an improved animated display button.

It is a further object of this invention to provide an animated display button that can selectively move a portion of the display.

It is still further an object of this invention to carry out the foregoing object where the movement opens and closes a portion of the display selectively presenting a hidden message or the like.

It is another object of this invention to carry out the foregoing objects using a wire of a titanium-nickel alloy activated by a pulsed electric current to move the display portions of the button.

These and other objects are preferably accomplished by providing a battery operated animated button which is worn by a user and includes a display portion which opens and closes to selectively display a hidden message or the like. A wire of a nickel-titanium alloy is activated to contract to move the display portion of the button.

BRIEF DESCRIPTION OF THE DRAWING

FIG. 1 is a vertical front view of a display button in accordance with the teachings of the invention;

FIG. 2 is a plan view of the interior parts of the button of FIG. 1;

FIG. 3 is a vertical rear view of the button of FIGS. 1 and 2;

FIG. 4 is an exploded view partly schematic of one of the sections or the button of FIGS. 1 and 2;

FIG. 5 is a plan view of the heart sections and background panel alone of the button of FIGS. 1 to 4 showing a position of actuation thereof;

FIG. 6 is a detailed plan view of a part of the button of FIGS. 1 to 5; and

FIG. 7 is a view taken along lines 7—7 of FIG. 6.

DESCRIPTION OF THE PREFERRED EMBODIMENT

Referring now to FIG. 1 of the drawing, a button 10 is shown comprised of a pair of interlocking circular sections 11, 12 (FIG. 2). Section 11 has an inner wall 13 surrounded by a peripheral wall 14 (FIG. 4). A door 15 (FIG. 2) may be provided in wall 13 for access to batter- As seen in FIG. 4, section 12 includes a transparent lens 25 having a circular inner wall 26 circumscribed by an outer peripheral wall 27. Although any suitable display may be used, a simulated heart is provided in two separate interlocking heart sections 28, 29. A circular background panel 30 is also provided. This panel 30 may be a separate section or the front side of a base plate 34, as will be discussed. As seen in FIG. 5, background panel 30 may have colorful indicia or the like visible through the transparent wall 26. Also, heart sections 28, 29, normally in engagement to simulate a heart, may have indicia 31, 32 on sections 28, 29, respectively, which cooperate to form a discernable saying or the like. As seen in FIGS. 1 and 5, and as will be explained further hereinbelow, when heart sections 28, 29 are separated, indicia 33 is exposed on background panel 30. This indicia 33 may complete a phrase or sentence when read along with indicia 31, 32.

Referring again to FIG. 4, base plate 34 is preferably circular (having panel 30 on one side thereof) and has a plurality of spaced mounting posts 35, 36. A printed circuit board 37 is provided having spaced holes 38, 39 adapted to mount to posts 35, 36, respectively, (FIG. 2) to secure board 37 in position on base plate 34. Of course, posts 35, 36 may be glued or otherwise secured to holes 38, 39 and any other suitable means may be provided for mounting board 37 to base plate 34.

A battery housing 40 is adapted to be mounted to base plate 34, as seen in FIG. 2. Housing 40 may be divided by wall 41 into two separate compartments receiving batteries 16 therein. Suitable battery contacts are provided in housing 40 with conduit 23 coupled to contact 42 of battery housing 40. Conduit 24 is coupled to board 37 and a conduit 43 leads from board 37 to contact 44 on battery housing 40.

Referring again to FIG. 4, a pair of arms 45, 46 are provided, arm 45 being a drive arm and arm 46 being an idler arm. Each arm 45, 46 has a main generally semicircular body portion 47, 48 (arms 45, 46, respectively), with gear teeth 49, 50, respectively, on the outer semicircular surface. Each arm 45, 46 has a central hole 51, 52, respectively, in its respective body portion 47, 48, adapted to receive therein a pin or post (posts 53, 54, respectively) that may be mounted on plate 34. This can be seen in FIG. 2 wherein arms 45, 46 are mounted on posts 53, 54, respectively.

Each arm 45, 46 has an elongated portion 55, 56 (FIG. 4), respectively, having a plurality of spaced bosses 57 thereon (see also FIGS. 6 and 7). Arm 45 (FIG. 6) also has a slotted arm portion 58 fixed to body portion 47 adapted to receive therein one end 59 of a wire 60. Wire 60 curves about pin 51, then hooks into the slot of arm portion 58 as seen in dotted lines in FIG. 6. The other end 61 of wire 60 is adapted to be secured to printed circuit board 37 (FIG. 2). A coil spring 62 is also provided having one end 63 secured to the lower portion of arm 45 (FIG. 4) and the other end 64 is secured to board 37.

Wire 60 is of a bio-metallic material, such as an alloy of nickel titanium. When an electrical current is applied to such a material, it contracts. One such material is sold under the trademark Flexinol by Dynalloy, Inc. of Irvine, Calif. This material is sold by Dynalloy as small wires which contract much as muscles do when electrical current is applied. These wires contract approximately 4.5% of their length with extremely high force for such a small size. The wires can selectively contract and return to normal in millions of cycles with little change in performance. Such wires are relatively stiff and may be about 0.006 inches or so in diameter. The wire herein may be between about 0.003 to 0.010 inches in diameter and of any suitable length. For example, a 1 inch long wire of about 3 mil diameter can be activated by a pulsed current of about 0.75 volts at 6 ohms.

Base plate 34 (FIG. 4) also has a plurality of arcuate spaced slots, such as slots 65, 66, and 70 to 73 of varying lengths extending through plate 34.

Referring to FIGS. 1 and 4, heart sections 28, 29 are mounted in wall 26 against display background panel 30. The heart sections 28, 29 may have spaced pins 77 (FIG. 4) or the like adapted to extend through slots 65, 66, and 70 to 73 in base plate 34. Arms 45, 46 are mounted on posts 53, 54. Pins 77 engage bosses 57 in arms 45, 46 in a friction fit engagement. Wire end 59 is connected to arm portion 58. Circuit board 37 is mounted to posts 35, 36. Wire end 61 is connected to board 37. Pins 77 may be inserted into any of the holes 65, 66, 70-73 (FIG. 4) to vary the position of the sections 28, 29.

Battery housing 40 and its contacts 42, 44 are mounted to base plate 34 with batteries 16 installed therein. The on-off switch 19, electronically coupled to circuit board 37, is turned on via push button 20, the power supply or batteries 16 actuating circuit board 37. This applies current to relatively stiff wire 60 when contracts thereby pulling drive arm 45. This simultaneously rotates arm 46 due to the meshing of gear teeth 49, 50. The heart sections 28, 30, normally in the FIG. 1 position, open or separate upon rotation of arms 45, 46 (due to the interconnection of pins 77 and bosses 57, pins 77 and bosses 57 moving in arcuate slots 65, 66, and 70 to 73) thus exposing the background of panel 30 (e.g., where indicia 31, 32 reads "Guess Who", (FIG. 1) for example, when separated, indicia 33 reads "Loves You" (FIG. 5) to complete the sentence.

Current is selectively delivered or pulsed to wire 60 so that it contracts, then expands, spring 62 returning arm 45 to the FIG. 2 position, then contracts again so that heart sections 28, 29 selectively open, then close.

Other than wire 60, which must be of a material that contracts upon application of an electrical current, and returns to normal after electrical current is ceased, any suitable materials may be used. Also, obviously any suitable parts of a design may be animated. For example, background panel 30 may be a face, and, instead of heart sections 28, 29, parts of the face may move upon actuation of the switch 19. Although a plurality of spaced arcuate slots are disclosed, obviously only a single aligned slot in base plate 34 is necessary to carry out the invention.

Any suitable pin 18 may be used. On-off switch 19 may be a simple conventional switch with a slidable on-off button as is well known in the art. Battery housing 40 and contacts for batteries 16 are conventional. Obviously, any suitable types of batteries may be used. Any suitable printed circuit board may be used having a pulsed electronic means 37' (FIG. 4) associated therewith thereon for selectively applying a pulsed electrical signal to wire 60.

Although a button has been described, any suitable display can be moved or animated in accordance with the teachings of the invention. Various modifications may occur to an artisan and the invention is to be limited only by the scope of the appended claims.

I claim:

1. A display device comprising:
a base plate having a display panel on one side, said base plate having at least one opening therethrough and a pair of movable members in direct meshing engagement mounted thereon;
at least one movable element disposed on the display panel, said element being coupled to at least one of said members through at least one of said openings for relative movement therewith;
relatively straight rigid wire means having one end fixed to one of said members adapted to contract upon the application of an electrical current thereto; and
pulsed electronic means engaging said wire means adapted to selectively apply pulsed electrical current to said wire means thereby contracting said wire means pulling said one of said members thereby moving both said one of said members and the other of said members interengaged therewith moving said movable element connected thereto.

2. In the device of claim 1 including a second movable element also disposed on said panel, said second movable element being coupled to at least one of said members for relative movement therewith.

3. In the device of claim 2 wherein each of said elements are normally interlocking to form a single discrete element which separates into said movable elements when actuated by application of said electrical current.

4. In the device of claim 1 wherein said movable members are spring biased.

5. In the device of claim 1 wherein said wire means includes a relatively rigid wire of a nickel-titanium alloy.

6. In the device of claim 5 wherein said wire is between about 0.003 to 0.010 inches in diameter.

7. In the device of claim 5 wherein said wire is about 3 mil in diameter and about 1 inch in overall diameter.

8. A display device comprising:
a base plate having a display panel on one side, said base plate having at least one opening therethrough and a pair of interengaged movable members mounted thereon;
at least one movable element disposed on the display panel, said element being coupled to at least one of said members through at least one of said openings for relative movement therewith;
wire means having one end fixed to one of said members adapted to contract upon the application of an electrical current thereto;
pulsed electronic means engaging said wire means adapted to selectively apply pulsed electrical current to said wire means thereby contracting said wire means pulling said one of said members thereby moving both said one of said members and the other of said members interengaged therewith moving said movable element connected thereof;

a second movable element also disposed on said panel, said second movable element being coupled to at least one of said members for relative movement therewith, each of said elements being normally interlocking to form a single discrete element which separates into said movable elements when actuated by application of said electrical current; and indicia on each of said elements and on said panel normally covered by said interlocking elements and exposed when said elements are moved.

9. A display device comprising:

a base plate having a display panel on one side, said base plate having at least one opening therethrough and a pair of interengaged movable members mounted thereon;

at least one movable element disposed on the display panel, said element being coupled to at least one of said members through at least one of said openings for relative movement therewith;

wire means having one end fixed to one of said members adapted to contract upon the application of an electrical current thereto;

pulsed electronic means engaging said wire means adapted to selectively apply pulsed electrical current to said wire means thereby contracting said wire means pulling said one of said members thereby moving both said one of said members and the other of said members interengaged therewith moving said movable element connected thereto; and each of said movable members including a gear portion meshing with the gear portion of the other of said members, and an elongated arm integral with said gear portion, at least one of said arms being interconnected to said movable element.

10. A display device comprising:

a base plate having a display panel on one side, said base plate having at least one opening therethrough and a pair of interengaged movable members mounted thereon;

at least one movable element disposed on the display panel, said element being coupled to at least one of said members through at least one of said openings for relative movement therewith;

wire means having one end fixed to one of said members adapted to contract upon the application of an electrical current thereto;

pulsed electronic means engaging said wire means adapted to selectively apply pulsed electrical current to said wire means thereby contracting said wire means pulling said one of said members thereby moving both said one of said members and the other of said members interengaged therewith moving said movable element connected thereto; and a transparent cover closing off the front side of said panel and a back cover closing off said base plate, and a switch mounted in said back cover electrically coupled to said electronic means.

11. In the device of claim 10 including battery means associated with said electronic means for powering said electronic means and a removable door mounted in said back cover for providing access to said battery means.

* * * * *